Dec. 23, 1958   J. E. GUTRIDGE ET AL   2,865,308
HOLD-DOWN DEVICE FOR FREIGHT VEHICLE
Filed July 30, 1954                                4 Sheets-Sheet 1
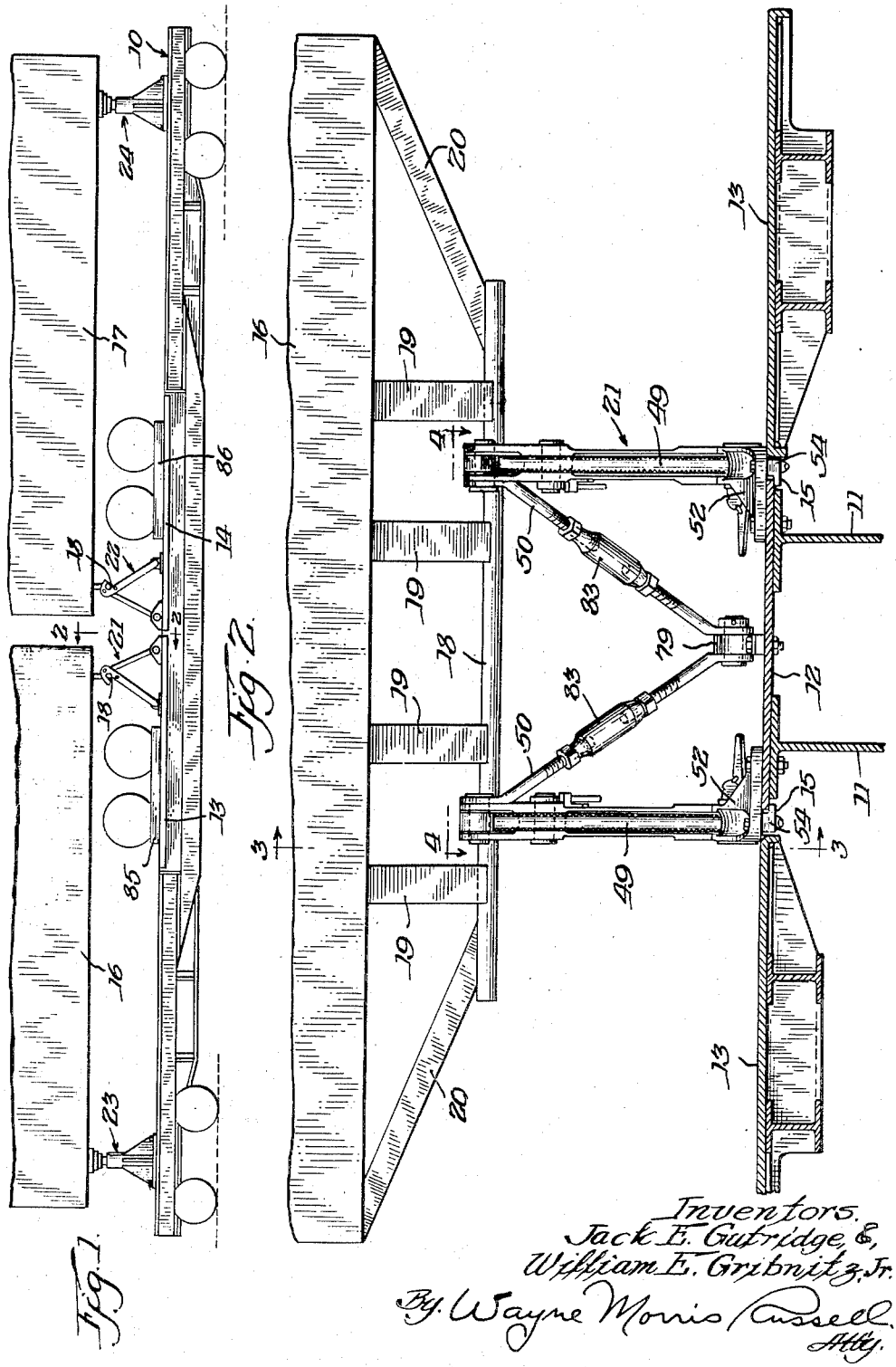
Inventors.
Jack E. Gutridge &
William E. Gribnitz, Jr.
By Wayne Morris Russell
Atty.

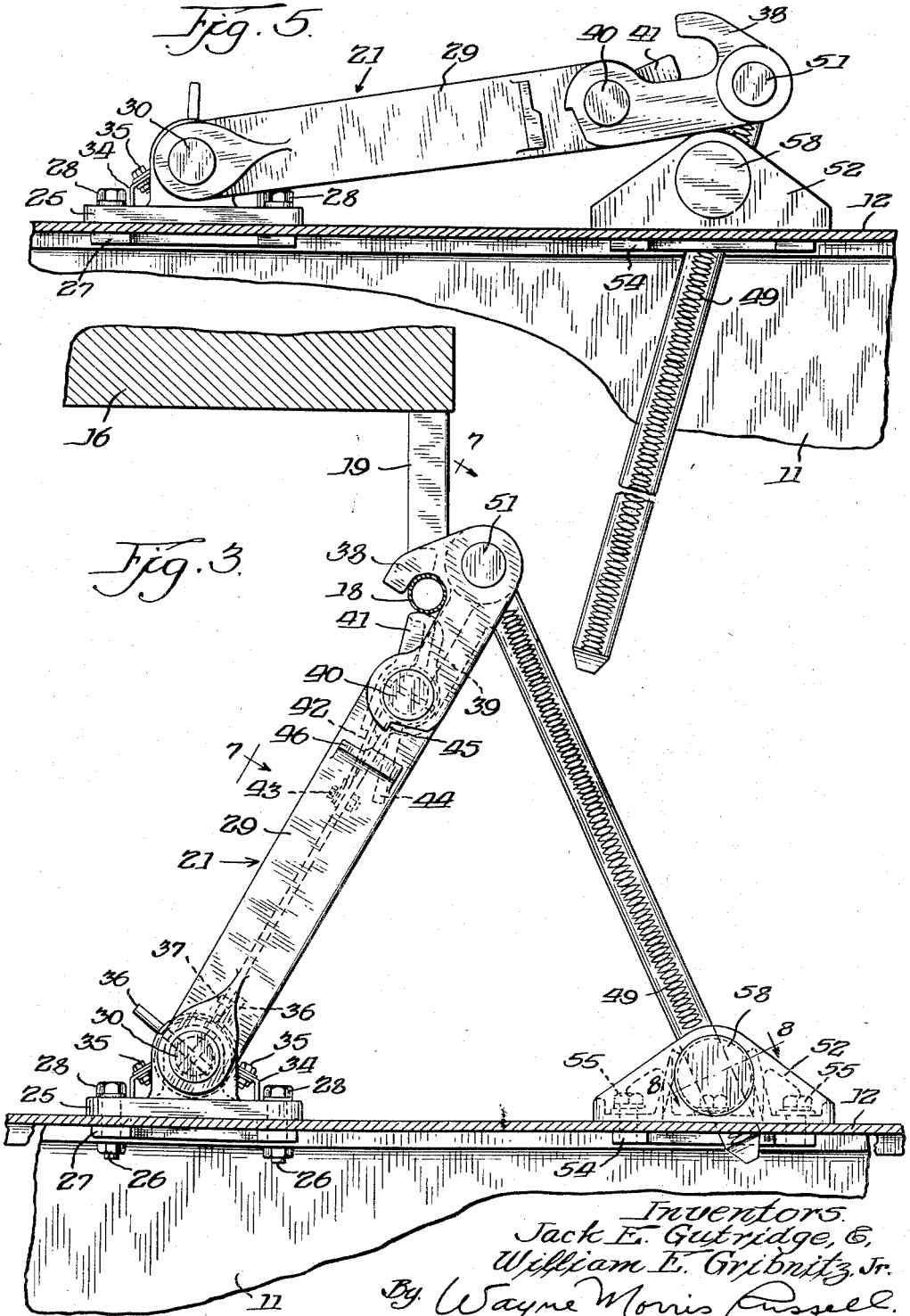

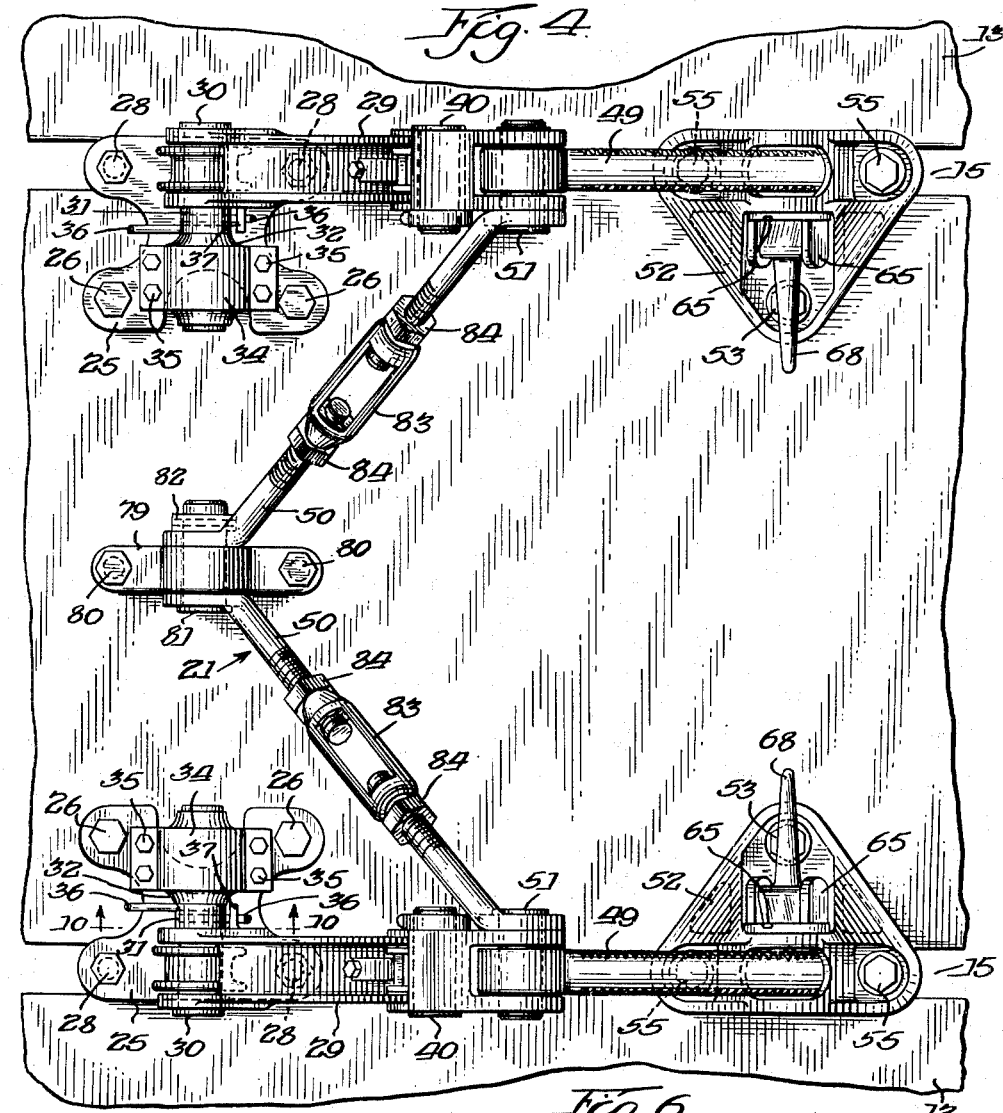

Dec. 23, 1958 J. E. GUTRIDGE ET AL 2,865,308
HOLD-DOWN DEVICE FOR FREIGHT VEHICLE
Filed July 30, 1954 4 Sheets-Sheet 4
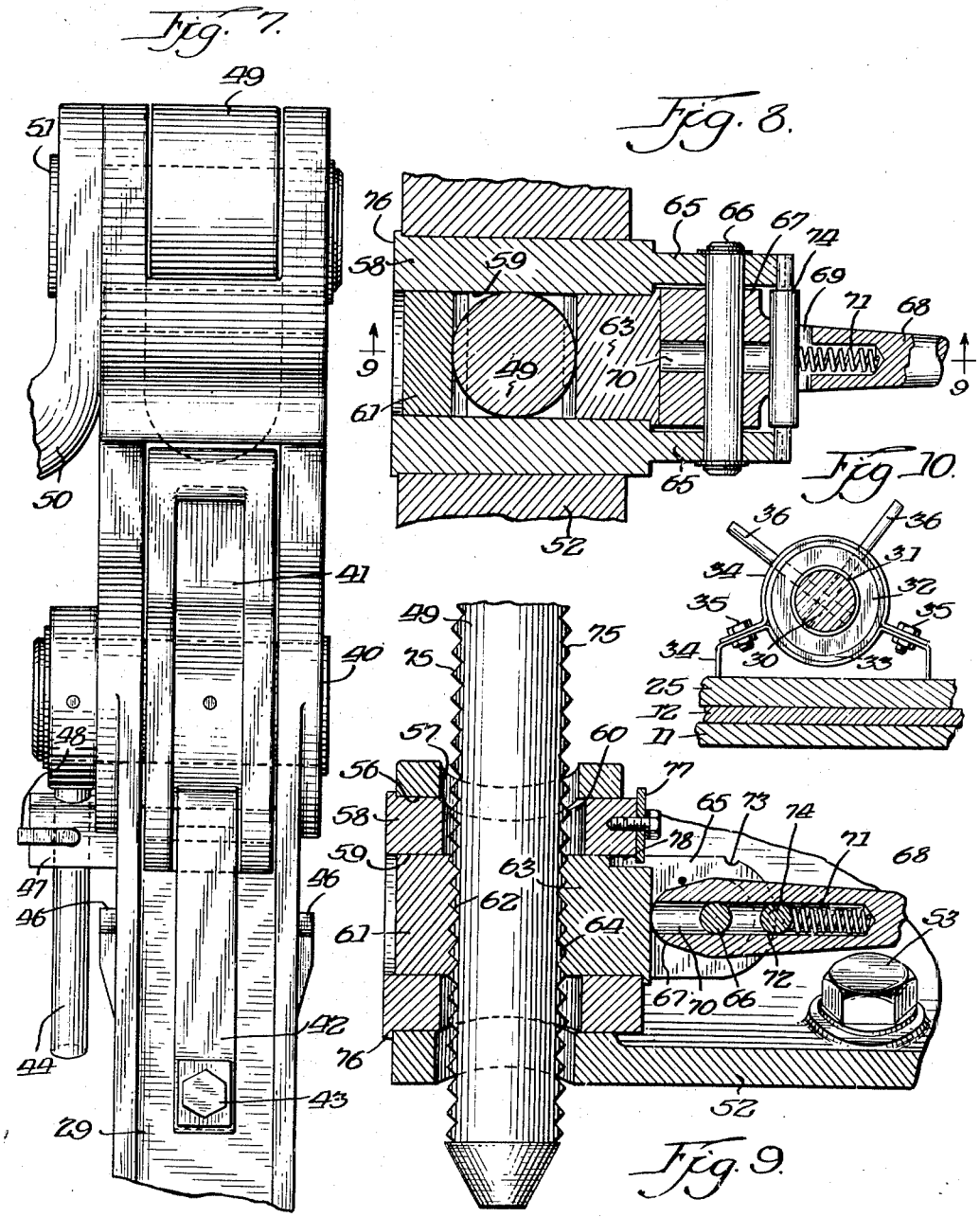
Inventors.
Jack E. Gutridge &
William E. Gribnitz, Jr.
By Wayne Morris Russell
Atty.

United States Patent Office
2,865,308
Patented Dec. 23, 1958

2,865,308

HOLD-DOWN DEVICE FOR FREIGHT VEHICLE

Jack E. Gutridge, Munster, Ind., and William E. Gribnitz, Jr., Chicago, Ill., assignors to Pullman-Standard Car Manufacturing Company, Chicago, Ill., a corporation of Delaware Application July 30, 1954, Serial No. 446,786

5 Claims. (Cl. 104—368)

This invention relates to the transportation of truck trailers on freight vehicles and is primarily concerned with a hold-down device mounted on the freight vehicle and adapted to be engaged with a trailer.

The principal object of the invention is to provide a hold-down device which is suitable for truck trailers having different bumper heights.

Another object of the invention is to provide a hold-down device which will receive the bumper of a trailer even though the bumper is sloped slightly from the horizontal.

Another object of the invention is to provide a hold-down device that is collapsible when not in use so as not to interfere with the loading trailers and to allow the freight vehicle to be used for carrying general freight.

An important object of the invention is to provide a hold-down device which can be moved to any position on the freight vehicle, allowing a pair of trailers to be loaded back to back or front to back or front to front.

A further object of the invention is to provide resilient means on the hold-down device for maintaining the device in upright position while the trailer bumper is being engaged with the device.

A further object of the invention is to provide a novel latch mechanism for the hold-down device adapted to engage the trailer bumper.

A further object of the invention is to provide novel mechanism for preventing pivotal movement of the hold-down device after the device has received the bumper of a trailer.

The foregoing and other objects of the invention are attained by the construction and arrangement illustrated in the accompanying drawings, wherein:

Fig. 1 is a side elevational view of a railway flat car showing two truck trailers loaded on the car;

Fig. 2 is a cross-sectional view taken on the line 2—2 of Fig. 1 showing the hold-down device of the present invention engaging the bumper on one of the trailers;

Fig. 3 is a cross-sectional view taken on the line 3—3 of Fig. 2;

Fig. 4 is a plan view of the hold-down device of Fig. 2 with the trailer bumper being omitted for clearness;

Fig. 5 is a side elevational view of the hold-down device in one of its collapsed positions;

Fig. 6 is a side elevational view of the hold-down device in its other collapsed position;

Fig. 7 is a view taken on the line 7—7 of Fig. 3 showing one of the latches on the hold-down device;

Fig. 8 is an enlarged sectional view taken on the line 8—8 of Fig. 3 showing one of the mechanisms for preventing pivotal movement of the hold-down device;

Fig. 9 is a sectional view taken on the line 9—9 of Fig. 8; and

Fig. 10 is an enlarged cross-sectional view taken on the line 10—10 of Fig. 4 showing one of the resilient means on the hold-down device.

The invention proposes a hold-down device for a truck trailer to be transported on a freight vehicle. The hold-down device comprises a pair of spaced supports secured to the floor of the freight vehicle. A pair of spaced parallel arms each have one end pivotally connected to one of the supports, with resilient means provided at the point of pivotal connection of each arm to its support, and hooks provided on the other ends of the arms. A pair of members each have one end pivotally connected to the other end of the arms. Another pair of supports are secured to the floor of the freight vehicle and the members are slidable through these supports. Releasable means are provided for locking the members so that they cannot move relative to their respective supports. The trailer bumper backs into the arms and pushes them downwardly until the bumper is received in the hooks on the arms. Thus the hold-down device is suitable for trailers having different bumper heights.

In the drawings, 10 generally designates a freight vehicle in the form of a railway flat car and having a centre sill consisting of a pair of I-beams 11 and a floor 12 secured to the center sill I-beams. At the center of the car a pair of elevators 13 are disposed on opposite sides of the center sill 11 and another pair of elevators 14 are disposed on opposite sides of the center sill. The elevators 13 and 14 are vertically movable from a position flush with the floor 12 of the car to a position below the floor of the car. The floor 12 is provided with a pair of spaced slots 15 extending longitudinally of the car for its full length with the elevators 13 and 14 forming the outer walls of the slots at the center of the car. A pair of truck trailers 16 and 17 to be transported on the car are shown loaded on the car and each trailer has a substantially horizontally disposed bumper 18 which is secured to vertical plates 19 and diagonal plates 20 which are secured to the trailer. A pair of hold-down devices or back supports 21 and 22 are adapted to engage the bumpers 18 on the trailers 16 and 17 respectively. A pair of fifth wheel stands 23 and 24 are adapted to support the front ends of trailers 16 and 17 respectively and each stand is adapted to receive the fifth wheel pin of its trailer.

Since the hold-down devices 21 and 22 are identical, only the hold-down device 21 will be described. A pair of supports 25 are positioned at the slots 15 in the floor 12 of the car. A pair of bolt and nut assemblies 26 extend through the floor and the outer flanges of the center sill beams 11 and the nuts are welded to the beam flanges so as not to be lost. A strip 27 is positioned in the slots 15 and a pair of screws 28 extend through each support 25 and are in threaded engagement with threaded holes in the adjacent strip, tightening of the screws causing the strip to be brought into bearing contact with the underface of the floor 12. Each support 25 and its two bolt and nut assemblies 26 and its strip 27 and its pair of screws 28 together form a clamp. A pair of arms 29 each have one end pivotally connected to one of the supports 25. More specifically, a lug upstands from and is integral with each support 25 and the adjacent arm 29 has flanges projecting on opposite sides of the lug and a pin 30 extends through the lug and flanges and projects therebeyond to rotatably mount one end of the arm on the pin. A torsionally acting spring is provided between this pin and the arm which reacts in torsion to resist movement of the arm. A metal cylinder 31 surrounds the projecting portion of the pin 30 and is fixedly secured to the pin and one end of the cylinder bears against the arm 29. A rubber cylinder 32 snugly surrounds and is cemented to the cylinder 31. A metal cylinder 33 surrounds the rubber cylinder 32 and fits snugly on the cylinder 32 and is cemented to the cylinder 32. A pair of clamps 34 are clamped around the cylinder 33 and are bolted together by bolts 35 and one of the clamps bears against the support 25. A pair of pins 36 are spaced 90 degrees apart and these pins extend through the cylinder 31 and the pin 30 and fit tightly in the cylinder and pin so as not to become separated therefrom. A lug 37 is integral with the arm 29 and projects between the pins 36. The other end of the arm 29 has a hook 38 thereon and there is a recess 39 in the arm at the hook. Each arm 29 is I-shaped in cross section for the major portion of its length but the web of the arm curves toward the edges of the arm at one end to form the bottom of the recess 39. A pin 40 extends through the arm 29 at the recess 39 and a latch 41 is positioned in the recess and is fixedly secured on the pin. A leaf spring 42 has one end positioned against the web of the arm 29 and a plate is disposed on the one end of the spring and a washer is disposed on the plate and a bolt 43 extends through the washer and plate and spring and web of the arm and a nut is threaded on the bolt. The other end of the spring 42 bears against the latch 41 and urges the latch out of the recess 39 and outwardly of the arm 29. A handle 44 has a ring fixedly secured on one end of the pin 40 and a bar is fixedly secured to and extends from the ring. A lug 45 is formed integral with the arm 29 and another lug 46 is spaced from the lug 45 and is integral with the arm. One lug 45 and one lug 46 are on each side of each arm 29 so that the arms may be interchanged. A block 47 is slidably mounted on the handle 44 so that it may be engaged on the lug 46 to hold the latch 41 inwardly of the arm 29 against the force of the spring 42 or on the lug 45 to hold the latch outwardly of the arm. The handle 44 and block 47 may be provided with apertures and a seal 48 may extend through these apertures to lock the latch 41 in its position outwardly of the arm 29 as best shown in Figures 3 and 7.

A pair of ratchet members 49 each have one end pivotally connected to the other end of one of the arms 29. A pair of rods 50 each have one end pivotally connected to the other end of one of the arms 29. More specifically, the upper end of each arm 29 has a pair of spaced lugs thereon and a pin 51 extends through the lugs and one end of the adjacent member 49 and through one end of the adjacent rod 50 and a collar is fixedly secured on the end of the pin. A pair of supports 52 are positioned at the other ends of the members 49 at the slots 15 and each support is secured to the floor 12 by a bolt and nut assembly 53, the nut being welded to the underface of the floor, and a strip 54 is positioned in each slot and a pair of screws 55 extend through each support and are in threaded engagement with threaded holes in the adjacent strip. Tightening of the screws 55 causes the strip 54 to come into bearing contact with the underface of the floor 12. Each support 52 and its bolt and nut assembly 53 and its pair of screws 55 and its strip 54 together form a clamp. Each support 52 is provided with an opening 56 extending through the upstanding lug on the support and the support is also provided with a hole 57 intersecting the opening 56 and extending through the upstanding lug and through the plate portion of the support. A barrel 58, circular in cross section, is positioned in the opening 56 in the support 52 and the barrel is provided with an axial opening 59 therethrough and a diametral hole 60 therethrough. An element 61, circular in cross section, has teeth 62 thereon and is fixedly secured in the opening 59 in the barrel 58 on one side of the hole 60 in the barrel. Another element 63, circular in cross section, has teeth 64 thereon and is slidably mounted in the opening 59 in the barrel 58 on the other side of the hole 60 in the barrel. The barrel 58 has a pair of spaced parallel lugs 65 thereon and a pin 66 extends through these lugs. A cam 67 is rotatably mounted on the pin 66 and a handle 68 is integral with the cam and is provided with a slot 69 therethrough. An aperture 70 extends inwardly from the free end of the cam 67 into the handle 68 and a coil spring 71 is disposed in the closed end portion of the aperture. The lugs 65 on the barrel 58 are provided with notches 72 and 73 spaced in the present instance seventy-five degrees apart and a pin 74, having its ends reduced in diameter, is disposed in the slot 69 in the handle 68 and the spring 71 urges the pin against the lugs. Swinging of the handle 68 will cause the cam 67 to come into contact with the element 63 and the element will slide in the opening 59 in the barrel inwardly of the barrel until the teeth 64 on the element come into engagement with the teeth 75 on the ratchet member 49. The member 49 will then be moved to the left as viewed in Fig. 9 until the teeth 75 on the member come into engagement with the teeth 62 on the element 61 and the pin 74 will seat in the notches 72 on the lugs 65 to maintain the element 63 in engagement with the member. Swinging of the handle 68 counterclockwise 75 degrees as viewed in Fig. 9 will cause the cam 67 to move out of contact with the element 63 with the pin 74 seating in the notches 73 to maintain the cam out of engagement with the element 63 allowing the member 49 to be moved through the holes 60 and 57 in the barrel 58 and support 52 respectively. More specifically, the cam 67 is moved out of engagement with the element 63 and downward force is applied on the member 49. The teeth 75 on the member 49 pressing against the teeth 62 on the element 61 will cause the barrel 58 to be moved to the left as viewed in Fig. 9 and the teeth on the member pressing against the teeth 64 on element 63 will cause the element to slide in the barrel toward the right as viewed in Fig. 9. The member 49 may then be freely moved through the holes 60 and 57 in the barrel 58 and support 52 respectively. The barrel 58 has a flange 76 on one end and a plate 77 is secured on the other end of the barrel by a screw and the outer end of the element 63 has a flange thereon and a recess 78 therein, The flange 76 and the plate 77 both limit the movement of the barrel 58 and the plate engages the wall of the recess 78 on the element 63 to prevent the element from sliding out of the barrel when the cam 67 is not in engagement with the element. The flange on the element 63 limits the inward movement of the element when the adjacent member 49 is not in the support 52.

A bracket 79 is positioned between the pair of supports 25 and a pair of bolts 80 extend through the bracket and the floor 12 of the car and nuts are threaded on the bolts and the nuts are welded to the underface of the floor. A pin 81 extends through the rods 50 and through the bracket 79 and a collar 82 is fixedly secured on the pin. Since both of the rods 50 are identical only one will be described. The rod 50 has one section which has left hand threads thereon and another section which has right hand threads thereon and a turnbuckle 83 is threaded on the sections and nuts 84 are threaded on the rods to prevent rotation of the turnbuckle. Upon moving the nuts 84 away from the turnbuckle 83 the turnbuckle may be rotated to either shorten or lengthen the rod 50.

A turntable 85 is pivotally mounted on one of the elevators 13 and another turntable 86 is pivotally mounted on one of the elevators 14. The rear end of the trailer 16 is backed onto the car so that the rear wheels at one side of the trailer move onto the turntable 85. The front end of the trailer 16 is then swung onto the car with the trailer wheels on the turntable 85 pivoting with the turntable while the rear wheels at the other side of the trailer roll on the floor 12 of the car. If the trailer 16 has great height, the elevators 13 will be lowered so that the trailer will clear tunnels and other overhead structures on a railroad. If the trailer 16 is of average height, the elevators 13 will not be moved but will remain flush with the floor 12 of the car. The trailer 16 is then backed up so that its bumper 18 engages the pair of arms 29 at some point below the hooks 38 and latches 41. The pair of arms 29 will be pushed downwardly toward the floor 12 of the car or pivoted in a clockwise direction as viewed in Fig. 3 against the force of the resilient means made up of cylinders 31, 32 and 33 and one of the pins 36. Each rod 50 will also pivot backwardly about the pins 81 and 51 with its respective arm 29. While the trailer 16 is being backed up, the cams 68 will not be in engagement with the elements 63 and the members 49 will slide freely through the holes 60 and 57 in the barrels 58 and supports 52 respectively. The bumper 18 of the trailer 16, upon reaching the latches 41, will ride upon the latches and force them inwardly of the arms 29 against the force of the springs 42 and the bumper upon moving off the latches will be received in the hooks 38 of the arms 29 and the springs 42 will urge the latches 41 outwardly of the arms. The outside diameter of the bumper 18 is greater than the distance between the end of one of the hooks 38 and the free end of its respective latch 41 and movement of the bumper out of the hooks cannot be accomplished unless the operator releases the latches. The operator will then swing the handles 68 so that the cams 67 come into engagement with the elements 63 and the pins 74 seating in the notches 72 to lock the members 49 in the supports 52. The front end of the trailer 16 is then lowered onto the fifth wheel stand 23 with the fifth wheel pin of the trailer being received by the stand. The trailer 17 is loaded on the car in a similar manner.

It is to be noted that the hole 57 in each support 52 and the hole 60 in its respective barrel 58 are directly over the adjacent slot 15 in the floor 12 of the car. To collapse the hold-down device 21 as shown in Fig. 5, the cams 67 are disengaged from the elements 63 and the members 49 are slid through the holes 57 and 60 in the supports 52 and barrels 58 respectively into the slots 15 in the floor 12 until the arms 29 lie upon the supports 52. To collapse the hold-down device 21 as shown in Fig. 6, the cams 67 are disengaged from the elements 63 and the members 49 pulled out of the supports 52. The arms 29 and rods 50 are then pivoted forwardly and downwardly against the force of the resilient means until the hooks 38 on the arms are in contact with the floor 12 of the car and the members 49 are then pivoted about the arms 29 forwardly and downwardly until the free ends of the members are in contact with the floor. When the hold-down device 21 is collapsed in the manner shown in Fig. 6 the pin 36 at the left in Fig. 3, will be exerting a force against the lug 37 on the arm 29 tending to move the arm upwardly, but insufficient to lift the arm. When the operator lifts the hold-down device 21 from its collapsed position in Fig. 6 only about one-half of the weight will have to be lifted since the resilient means will be urging both arms 29 upwardly. The hold-down device 21 in the collapsed position of Fig. 6 is lower than in the collapsed position of Fig. 5. The collapsed position of Fig. 6 is used when the structure of the trailer 16 is so low that it would collide with the hold-down device in the collapsed position of Fig. 5.

The height of the bottom of a truck trailer will vary according to the size of the trailer. From this it follows that the height of the trailer bumper will be different for different sizes of trailers. The height of the bottom of a truck trailer will vary with the different manufacturers for trailers of substantially the same size. Again it follows that the height of the trailer bumper will be different for trailers of substantially the same size made by different manufacturers. Applicants' hold-down device will accommodate any trailer regardless of the bumper height of the trailer. Thus applicants' hold-down device will accommodate trailers having different bumper heights. This is because the trailer bumper will push the arms 29 backwardly and the bumper will continue to slide on the arms until it is received in the hooks 38 on the arms. The bumper of a trailer may not be perfectly horizontal, that is, it may slope 5 degress or even 10 degrees from the horizontal to one side or the other. Applicants' hold-down device 21 will receive a trailer bumper that is sloped 5 or 10 degrees from the horizontal because one arm 29 and its hook 38 and its member 49 and its rod 50 moves independently of the other arm 29 and its hook 38 and its member 49 and its rod 50. Once the bumper is received between the hooks 38 and the latches 41 of the hold-down device 21 and the cams 68 engaged with the elements 63 to lock the members 49 in the supports 52 so that the members cannot move relative to the supports, the bumper cannot be moved. Thus it will be seen that the bumper cannot be moved forwardly out of the hold-down device or backwardly out of the hold-down device and the bumper cannot be moved vertically upward out of the hold-down device or vertically downward out of the hold-down device. Therefore it will be seen that applicants' hold-down device prevents movement of the trailer longitudinally of the car and it also prevents vertical movement of the trailer. During transportation of the trailer 16 on the car, the trailer sometimes moves transversely of the car. Upon transverse movement of the trailer 16 the plates 19 will come into contact with the arms 29 and tend to bend the arms. The rods 50 prevent the bending of the arms 29.

If the fifth wheel stands and hold-down devices are not collapsible, trailers can be loaded on the car from the sides of the car but not from the ends of the car. The trailers cannot be loaded on the ends of the car since the trailer rear wheel axles or other trailer structure would collide with either the fifth wheel stands or hold-down devices. Applicants' hold-down devices 21 and 22 are collapsible and the fifth wheel stands 23 and 24 are also collapsible. This means that trailers can be loaded on the car from the sides of the car or from the ends of the car. The hold-down devices 21 and 22 are put on the car at the ends of the car and these devices can be slid longitudinally of the car for its full length, and out of the slots. Thus the hold-down devices 21 and 22 may be placed anywhere on the car. The fifth wheel stands 23 and 24 are also put on the car at the ends of the car and these stands can be slid longitudinally of the car for its full length. Thus the fifth wheel stands 23 and 24 may be placed anywhere on the car. This means that a pair of trailers can be loaded on a car back to back or front to back or front to front. The hold-down devices 21 and 22 can be slid in the slots 15 to the ends of the car and removed from the car. The fifth wheel stands 23 and 24 can be slid in the slots 15 to the ends of the car and removed from the car. With the hold-down devices 21 and 22 and the fifth wheel stands 23 and 24 removed from the car, the car can be used for carrying general freight.

From the foregoing, it will be seen that there has been provided a hold-down device which is suitable for trailers having different bumper heights and which will receive the bumper of a trailer even though the bumper slopes slightly with respect to the horizontal.

What is claimed is:

1. In a freight vehicle adapted to carry a truck trailer having a substantially horizontally disposed bumper on one end, a floor, and a holding device for the trailer positioned on the floor and comprising an arm having a hook on one end, a pin extending through the other end of the arm, a support on the pin secured to the floor, resilient means comprising a torsional spring surrounding the pin and adapted to engage the arm to resist downward movement of the arm, a member having one end pivotally connected to said one end of the arm, a support positioned at the other end of the member and secured to the floor and provided with an opening therethrough to receive the member, the trailer being adapted to be backed up so that the bumper engages the arm pushing the arm downwardly to rotate the arm about said pin against the force of the resilient means and the member sliding in the last-named support until the bumper is received in the hook, and interengaging means comprising a notched clamping element on the support and notches on the member to prevent movement of the member through the support after the bumper is received in the hook on the arm.

2. In a freight vehicle adapted to carry a truck trailer having a substantially horizontally disposed bumper on one end, a floor, and a holding device for the trailer positioned on the floor and comprising a pair of spaced arms each having a hook on one end, a pin extending through the other end of each arm, a support on each pin secured to the floor, resilient means comprising a torsional spring surrounding each pin and adapted to engage the respective arms to resist downward movement of the arms, a pair of members each having one end pivotally connected to said one end of an arm, a support positioned at the other end of each member and secured to the floor and provided with an opening therethrough to receive the respective member, the trailer being adapted to be backed up so that the bumper engages the arms pushing the arms downwardly to rotate the arms about said respective pins against the force of the resilient means and the members sliding in the last-named supports until the bumper is received in the hooks, and interengaging means comprising a notched clamping element on the respective support and notches on each member to prevent movement of the members through the supports after the bumper is received in the hooks on the arms.

3. In a freight vehicle adapted to carry a truck trailer having a substantially horizontally disposed bumper on one end, a floor, and a holding device for the rtailer positioned on the floor and comprising a pair of spaced arms each having a hook on one end, a pin extending through the other end of each arm, a support on each pin secured to the floor, resilient means comprising a torsional spring surrounding each pin and adapted to engage the respective arm to resist downward movement of the arm, a pair of members each pivotally connected at one end to said one end of one of the arms, a support positioned at the other end of each member and secured to the floor and provided with an opening therethrough to receive the respective member, a latch positioned adjacent the hook on each arm and pivotally mounted on the respective arm, a spring carried by each arm and urging the latch outwardly of the respective arm, the trailer being adapted to be backed up so that the bumper engages the arms pushing the arms downwardly to rotate the arms about said respective pins against the force of the resilient means and the members sliding in the last-named supports and the bumper upon reaching the latches forcing them inwardly of the arms against the force of the springs and the bumper upon riding off the latches being received in the hooks and the springs urging the latches outwardly of the arms whereby the hooks and latches together hold the bumper in the arms, and interengaging means comprising a notched clamping element on the respective support and notches on each member to prevent movement of the members through the supports after the bumper is received in the hooks on the arms.

4. In a freight vehicle adapted to carry a truck trailer having a bumper, a holding device for the trailer mounted on the vehicle and comprising an arm provided with a recess, a pin extending through the arm at the recess, a latch adapted to engage the bumper positioned in the recess in the arm and fixedly secured to the pin, a spring carried by the arm and engaging the latch and urging the latch outwardly of the arm, a handle fixedly secured on the pin, a block slidably mounted on the handle, a first lug secured to the arm, a second lug secured to the arm, the block being adapted to engage the first lug to hold the latch inwardly of the arm against the force of the spring and the block being adapted to engage the second lug to hold the latch outwardly of the arm.

5. In a freight vehicle adapted to carry a truck trailer, a holding device for the trailer mounted on the vehicle and comprising a member having teeth thereon, a support provided with a hole therethrough and an opening therethrough, a barrel positioned in the opening in the support and provided with an opening therethrough and a hole therethrough, the member extending through the hole in the barrel and the hole in the support, a first element having teeth thereon secured in the opening in the barrel on one side of the hole in the barrel, a second element having teeth thereon slidably mounted in the opening in the barrel on the other side of the hole in the barrel, a cam pivotally mounted on the barrel adjacent the opening therein and having a handle thereon, swinging of the handle causing the cam to engage the second element and causing the member to move into engagement with the teeth on the first element to prevent movement of the member through the support and swinging of the handle causing the cam to move out of engagement with the second element allowing the member to be moved through the support.

References Cited in the file of this patent

UNITED STATES PATENTS

| | | |
|---|---|---|
| 1,449,229 | Hendrickson | Mar. 20, 1923 |
| 1,559,713 | Lester | Nov. 3, 1925 |
| 1,734,303 | Ross | Nov. 5, 1929 |
| 1,780,277 | Seeley | Nov. 4, 1930 |
| 1,785,069 | Boudette | Dec. 30, 1930 |
| 2,036,344 | Menhall | Apr. 7, 1936 |
| 2,052,914 | Williams | Sept. 1, 1936 |
| 2,099,288 | Allen | Nov. 16, 1937 |
| 2,170,581 | West et al. | Aug. 22, 1939 |
| 2,204,667 | Dooley et al. | June 18, 1940 |
| 2,402,283 | Hewitt | June 18, 1946 |
| 2,436,681 | Swenson | Feb. 24, 1948 |
| 2,489,024 | Gaynor | Nov. 22, 1949 |
| 2,503,368 | Willetts | Apr. 11, 1950 |
| 2,605,007 | Gaynor | July 29, 1952 |